United States Patent
Esclamadon

[11] 3,868,459
[45] Feb. 25, 1975

[54] METHOD OF KILLING NEMATODES USING CERTAIN HALOMETHYL OXATHIENES

[75] Inventor: Christian Esclamadon, Billere, France

[73] Assignee: Societe Nationale des Petroles d'Aquitaine, Courbevoie, France

[22] Filed: Sept. 21, 1972

[21] Appl. No.: 290,869

Related U.S. Application Data

[63] Continuation-in-part of Ser. No. 172,287, Aug. 16, 1971, , which is a continuation of Ser. No. 825,937, May 17, 1969, abandoned.

[30] Foreign Application Priority Data

May 21, 1968 France .............................. 68.152542

[52] U.S. Cl. .............................................. 424/276
[51] Int. Cl. ............................................... A01n 9/12
[58] Field of Search .................. 424/276; 260/327 P

[56] References Cited
UNITED STATES PATENTS

| | | | |
|---|---|---|---|
| 2,508,005 | 5/1950 | Ballard et al. .................. | 260/327 P |
| 3,082,214 | 3/1963 | Bluestone .......................... | 260/327 |
| 3,728,357 | 4/1973 | Knight et al. ..................... | 260/327 P |

FOREIGN PATENTS OR APPLICATIONS

| | | |
|---|---|---|
| 1,578,066 | 8/1969 | France |
| 1,957,859 | 5/1971 | Germany |

OTHER PUBLICATIONS

Chemical Abstracts 63:13245d (1965).

*Primary Examiner*—Stanley J. Friedman
*Assistant Examiner*—Leonard Schenkman
*Attorney, Agent, or Firm*—Ostrolenk Faber Gerb & Soffen

[57] ABSTRACT

Halomethyl oxathiene derivatives of the general formula:

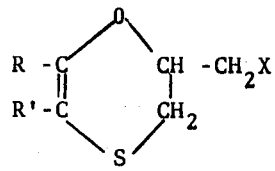

in which X represents a halogen atom, R a saturated or unsaturated hydrocarbon radical which may have one or more heteroatoms and R' a hydrogen atom or a radical having the same definition as R are effective nematocides and fungicides.

4 Claims, No Drawings

METHOD OF KILLING NEMATODES USING CERTAIN HALOMETHYL OXATHIENES

This application is a continuation-in-part of application Ser. No. 172,287 filed Aug. 16, 1971, which is a streamline continuation of application Ser. No. 825,937 filed May 17, 1969, now abandoned.

The present invention relates to a new series of halogen compounds derived from 1,4-oxathia-2-ene, which is a hexagonal heterocyclic compound having one atom of oxygen, one atom of sulfur and possessing one unsaturated carbon-to-carbon double bond. The new compounds are effective nematocides and fungicides.

The compounds according to the invention can be represented by the following general formula:

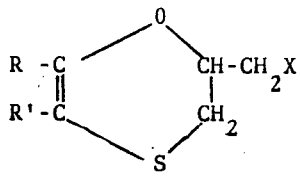

in which R represents a hydrocarbon radical which may possibly have one or more heteroatoms, R' represents hydrogen or a radical of the same nature as R and X represents a halogen atom, preferably chlorine or bromine.

The radicals R and R' may be saturated and connected to one another so as to form a cyclic ring together with the carbon atoms of the oxathiene heterocyclic ring to which they are attached.

The hydrocarbon radicals represented by R or R' may have up to 12 carbon atoms and can be alkyl radicals such as methyl, ethyl, propyl, isopropyl, butyl, isobutyl, hexyl or octyl radicals, for example, alkenyl radicals such as allyl, butenyl or hexenyl radicals, for example, substituted or unsubstituted aryl radicals such as phenyl, chlorophenyl, dichlorophenyl or trimethylphenyl radicals, for example, or cycloalkyl radicals such as the cyclohexyl radical.

When the radicals R and R' are connected to one another, the cyclic ring formed with the carbon atoms of the oxathiene heterocyclic ring can have up to 12 carbon atoms in the nucleus, the said nucleus preferably consisting entirely of carbon.

The new compounds are prepared by reacting 3-hydroxy-thietane (3-hydroxy-thiacyclobutane or 3-hydroxytrimethylene sulfide) with a halogenated ketone of the general formula:

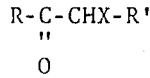

in which R, R' and X have the meanings given above, and dehydrating the product of the raction.

In a preferred mode of operating the process, the dehydration is effected by heating the reaction product to a temperature higher than 100°C., the water released being eliminated.

With regard to the ketones, there can be used with advantage, chloro or bromo-propanone, 1-chloro or 1-bromo-2-butanone, 3-chloro or 3-bromo-2-butanone, 1-chloro or 1-bromo-2-pentanone, 3-chloro or 3-bromo-2-pentanone, 2-chloro or 2-bromo-3-pentanone or 2-chloro-cyclohexanone, this list not being limitative.

The temperature at which the raction between the 3-hydroxy-thietane and the halogenated ketone is carried out varies according to the nature of the ketone. In general, it is between 40° and 95° C.

The halogenated ketone

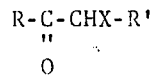

which is used, is activated by the C=O unsaturation of the carbon atom which is in the alpha-position relative to the carbon atom which carries the halogen; the reaction takes place very easily, generally without a catalyst. However, in order to increase the speed of the reaction, it is advantageous to use an aliphatic amine, preferably a tertiary amine.

The reaction will take place without a solvent but a polar solvent can be used, for example, tetrahydrofuran.

Very good results are obtained by direct heating of 3-hydroxy-thietane with the selected halogenated ketone, it being possible for the latter to be in slight excess relative to the stoichiometric proportion corresponding to the equations given hereinafter.

The product obtained at the end of the reaction is a sulfuretted halohydrin. During the heating of this compound at a temperature of at least 100° C., enolization of the ketone group and dehydration take place. The corresponding 1,4-oxathiene cyclic derivative is obtained.

Without prejudice to the way in which the reaction does take place, one can illustrate the method of preparation according to the invention by the following equations:

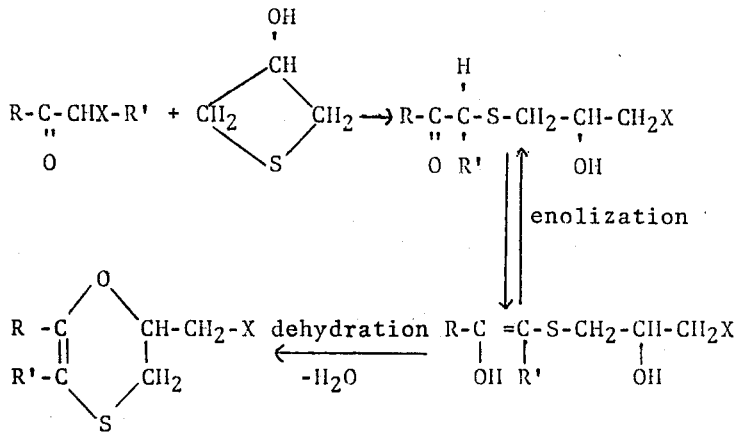

The halomethyl oxathienes of the present invention are effective nematicides and fungicides. The compounds can be applied alone directly to the area to be treated or the aforesaid compounds may be formulated as an emulsifiable concentrate or as a dilute spray. The compounds may also be formulated on granules for application with a conventional fertilizer spreader, in the form of a wettable powder for application, as a dust for application with a conventional duster, or absorbed on activated carbon for application on seeds.

The nematicidal and fungicidal compounds of the present invention are employed in an effective nematicidal or fungicidal amount. Since the compounds are effective even when employed in dilute concentration, e.g., in concentrations of up to 5% or even higher, it is therefore preferred to incorporate the compounds into a variety of suitable solid or liquid carriers or diluents. Such compositions can be prepared in either the form of a suspension in a suitable nonsolvent or as a dust. A suspension or dispersion of the compound in a nonsolvent such as water may be prepared for direct application to infested soil. Alternatively, a prepared suspension of the compound can be modified by the addition thereto of small amounts, usually from about 1 to 5 parts, of a commercially available dispersing or surface active agent per 100 parts of the compounds. Examples of surface active compounds which can be used include the sodium salts of polymerized propyl naphthalene sulfonic acid, an alkyl aryl polyether alcohol and a modified phthalic glycerol alkyd resin.

In the preparation of dust, the compound can be mixed with a finely divided inert granular material as a carrier in any conventional manner. Useful carriers include kaolin, bentonite, talc, pumice, silica, chalk, wood flour, fuller's earth, activated carbon, charcoal, and the like.

The following Examples are set forth to further illustrate the invention but are not intended to limit it.

EXAMPLE 1

In a 500 cc reaction vessel, one mixes 110 g (1.2 mole) of chloro-propanone and 90 g (1 mole) of 3-hydroxy-thietane. While stirring continuously, the mixture is heated for 24 hours at a temperature of 80°C. The temperature is then raised to enable the excess chloro-propanone to distill.

The temperature in excess of 100° C. is maintained and the product of the reaction distills. Water is eliminated and 2-methyl-6-chloromethyl-1,4-oxathia-2-ene is obtained with a yield of 50%.

This compound has the following characteristics:
Boiling point 88° C. under 0.6 mm Hg.
Refractive index $n_D^{20} = 1.5342$
Its elementary analysis is:

|  | C % | H % | S % | Cl % |
| --- | --- | --- | --- | --- |
| Found | 43.95 | 5.52 | 19.10 | 21.33 |
| Calculated | 43.70 | 5.47 | 19.45 | 21.60 |

The infra-red and NMR spectra are in conformity with the following structure:

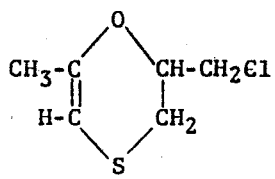

EXAMPLE 2

In a 500 cc reaction vessel, one mixes 106.5 g (1 mole) of 3-chloro-2-butanone and 90 g (1 mole) of 3-hydroxythietane. This mixture is raised to a temperature of 90° C. with stirring; 10 drops of tributylamine are added as a catalyst and the operating conditions are maintained for 20 hours.

The mixture is then distilled under reduced pressure and 72 g of 2,3-dimethyl-6-chloromethyl-1,4-oxathia-2-ene is obtained.

This compound has the following characteristics:
Boiling point 75° C. under 0.35 mm Hg
Refractive index $n_D^{20} = 1.5309$
Its elementary analysis is:

|  | C % | H % | S % | Cl % |
| --- | --- | --- | --- | --- |
| Found | 46.85 | 6.13 | 18.10 | 18.15 |
| Calculated | 47.06 | 6.16 | 17.93 | 19.891 |

This corresponds to the following structure:

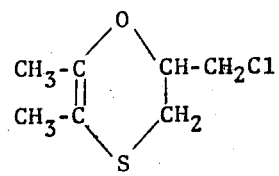

EXAMPLE 3

The operation is carried out as in the preceding Example but the halogenated ketone is 2-chloro-cyclohexanone and tetrahydrofuran is added as a solvent.

The following quantities are used:

| 2-Chloro-cyclohexanone | 132.5 | g (1 mole) |
| --- | --- | --- |
| 3-Hydroxy-thietane | 90 | g (1 mole) |
| Tetrahydrofuran | 100 | g |
| Tributylamine | 10 | drops |

After heating for 24 hours, with the solvent being refluxed and with stirring, the reaction mixture is distilled: 31 g of product are obtained. This is 2-chloromethyl-5,6,7,8-tetrahydro-benz-1,4-oxathiane.

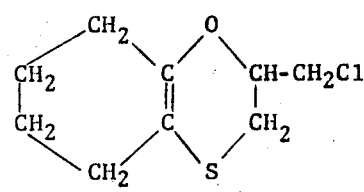

If the operation is carried out without a catalyst the reaction is complete after heating for 30 hours.

This new product has the following characteristics:
Boiling point 117° C. under 0.25 mm Hg
Refractive index $n_D^{20} = 1.5528$
Its elementary analysis is:

|  | C % | H % | S % | Cl % |
| --- | --- | --- | --- | --- |
| Found | 52.69 | 6.54 | 16.49 | 14.87 |
| Calculated | 52.81 | 6.36 | 15.65 | 17.36 |

EXAMPLE 4

A soil composition containing 2 parts dry sand and 1 part sterilized loam was artificially infested with root knot eelworm, Meloidogyne spp., by admixing the soil composition with finely chopped nematode infected tomato roots. Approximately 50 g of roots per 10 liters of soil were used.

750 cc portions of the infected soil contained in polythene bags were treated with 25 cc of a 5% acetone-water suspension of 2-methyl-6-chloromethyl-1,4-oxathia-2-ene at concentrations sufficient to produce dosage rates of the compound to soil equivalent to 250 and 125 parts per million active ingredient per volume of soil.

After adding the suspension, soil and compound were thoroughly mixed by kneading the polythene bag which was then placed in a screw cap jar, sealed and incubated for 5 days at 26° C. After incubation, the soil was transferred from the bags to three 3 inch diameter plant pots and a small seedling tomato placed in each pot. The seedlings were grown for two weeks in a controlled environment room (26° C. at 65% to 85% relative humidity in 14 hours of light at 600 ft. candles). The seedlings were then removed from the pots, their roots washed and assessed for nematode attack, i.e., root knotting. The efficiency of the treatment was based on an index damage where 0 = no attack and 4 = very severe root damage, i.e., no control.

The results in which the average of 3 plants at each concentration level was taken were:

| Dosage Rate in ppm | Root-Knot Index |
|---|---|
| 250 | 0.2 |
| 125 | 1.5 |
| Untreated | 4.0 |

EXAMPLE 5

Example 4 was repeated substituting 2,3-dimethyl-6-chloromethyl-1,4-oxathia-2-ene for the 2-methyl-6-chloromethyl-1,4-oxathia-2-ene of Example 4. The suspensions were applied at concentrations sufficient to produce dosage rates of compound-to-soil equivalent to 250, 125 and 62.5 parts per million active ingredient per volume of soil.

The results in which the average of 3 plants at each concentration level was taken were:

| Dosage Rate in ppm | Root-Knot Index |
|---|---|
| 250 | 0.0 |
| 125 | 1.1 |
| 62.5 | 2.5 |
| Untreated | 4.0 |

EXAMPLE 6

Sufficient 2-methyl-6-chloromethyl-1,4-oxathia-2-ene was incorporated into the nutrient medium known as potato dextrose agar in the molten state to produce a concentration of 100 parts per million weight/volume of medium. The mixing was carried out in petri dishes and the cooled culture plates were inoculated with mycelial plugs (6 mm diameter) of the following fungal species: Pythium ultimum and Rhizoctonia solani.

The plates were incubated at 22°C. for 7 days after which the mycelial diameters were measured and compared with untreated controls. In every case, the compound was observed to have reduced fungal growth by greater than 95%.

EXAMPLE 7

Example 6 was repeated except that 2,3-dimethyl-6-chloromethyl-1,4-oxathia-2-ene was substituted for the 2-methyl-6-chloromethyl-1,4-oxathia-2-ene. After the 7 days incubation, the compound was observed to have reduced fungal growth by greater than 95%.

Results similar to those reported in Examples 4 and 5 can be obtained by using 2,3-dimethyl-6-bromomethyl-1,4-oxathia-2-ene or 2-chloromethyl-5,6,7,8-tetrahydro-benz-1,4-oxathiane as the active compound.

Various changes and modifications can be made in products and processes of this invention without departing from the spirit and the scope thereof. The various embodiments set forth herein were presented to further illustrate the invention but were not intended to limit it.

I claim:

1. A method of controlling nematodes which comprises applying thereto an effective nematocidal amount of a halomethyl oxathiene compound of the formula

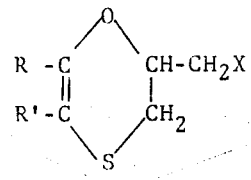

wherein X is chlorine, R is methyl, and R' is hydrogen or methyl, or wherein R and R' together form a tetramethylene group.

2. The method of claim 1 wherein said compound is 2-methyl-6-chloromethyl-1,4-oxathia-2-ene.

3. The method of claim 1 wherein said compound is 2,3-dimethyl-6-chloromethyl-1,4-oxathia-2-ene.

4. The method of claim 1 wherein said compound is 2-chloromethyl-5,6,7,8-tetrahydro-benz-1,4-oxathiane.

* * * * *